May 11, 1948. E. C. CARTER ET AL Re. 22,999

PRINTING CONTROL MEANS FOR CASH REGISTERS

Original Filed June 14, 1943 4 Sheets-Sheet 1

Elmer C. Carter and
Charles G. Dudis
Inventors

By Earl Benesto
Their Attorney

May 11, 1948. E. C. CARTER ET AL Re. 22,999

PRINTING CONTROL MEANS FOR CASH REGISTERS

Original Filed June 14, 1943 4 Sheets-Sheet 2

Elmer C. Carter and
Charles G. Dudis
Inventors

By Hearl Benist
Their Attorney

PRINTING CONTROL MEANS FOR CASH REGISTERS

Original Filed June 14, 1943 4 Sheets-Sheet 3

Elmer C. Carter and
Charles G. Dudis
Inventors

By Earl Benst
Their Attorney

PRINTING CONTROL MEANS FOR CASH REGISTERS

Original Filed June 14, 1943 4 Sheets-Sheet 4

Elmer C. Carter and
Charles G. Dudis
Inventors

By Pearl Benedict
Their Attorney

Reissued May 11, 1948

Re. 22,999

UNITED STATES PATENT OFFICE 22,999

PRINTING CONTROL MEANS FOR CASH REGISTERS

Elmer C. Carter, West Milton, and Charles G. Dudis, Dayton, Ohio, assignors to The National Cash Register Company, Dayton, Ohio, a corporation of Maryland Original No. 2,416,792, dated March 4, 1947, Serial No. 490,750, June 14, 1943. Application for reissue February 13, 1948, Serial No. 8,138

5 Claims. (Cl. 101—93)

This invention relates to cash registers and accounting machines of the type shown in United States Letters Patent Nos. 1,812,194 and 1,963,733, issued June 30, 1931, and June 19, 1934, respectively, to Samuel Brand; Nos. 1,817,883 and 1,865,147, issued August 4, 1931, and June 28, 1932, respectively, to Bernis M. Shipley; and No. 2,154,381, issued April 11, 1939, to John H. Gruver, and is directed to the printing mechanisms of such machines.

In machines of this type, selective control means is provided for controlling the operativeness of the different printing hammers so that only the desired hammer or hammers will be operative during certain kinds of operations. Previously, operating devices, actuated by strong springs, were provided for each of said hammers, all of said devices being actuated simultaneously during each operation of the machine, regardless of the operativeness of the different printing hammers. The many idle operations thus performed by these devices produced unnecessary wear and strain upon their component parts, resulting in a certain amount of breakage of certain of said parts, and, in general, shortening the life of some of the other of said parts. In addition, the simultaneous actuation of all of said devices during each operation of the machine placed a heavy load on the machine operating mechanism and created considerable noise incident to the operation of said devices.

The present invention provides individual devices, each employing a comparatively light spring for actuation thereof, for operating the different printing hammers, each device being actuated only when its appropriate printing hammer is operative. These devices are so arranged that, if more than one printing hammer is to be operated during the same operation of the machine, certain of said devices will be actuated in alternating order. The elimination of the idle operations of said devices, alternating the order of actuation of certain of said devices, and the use of lighter springs for the actuation thereof have resulted in less breakage of certain of the parts in said printing mechanism, as well as greatly increased the life of other of said parts. In addition, the heavy load normally placed on the machine operating mechanism by the operation of said device has been greatly alleviated, and the noise formerly occasioned by the simultaneous operation of all of said devices during each operation of the machine has been considerably reduced. The present invention has also eliminated the need for the rebound-preventing pawls usually employed in connection with the printing hammers.

It is therefore an object of this invention to provide simple means for reducing the noise incident to the operation of the printing hammer operating mechanism.

Another object is the provision of means for alleviating the load normally placed on the machine operating mechanism by the printing hammer operating devices.

An additional object is the provision of means for eliminating the need for the usual rebound-preventing pawls used in connection with the printing hammers.

A further object is the provision of means employing much lighter springs than those normally used for operating the printing hammers.

Another object is to provide printing hammer actuating means, the effectivity of said means being controlled by said printing hammer.

An additional object is to provide means controlled by the printing hammer for determining the effectivity of the printing hammer operating means.

Another object is to provide novel means for controlling the effectivity of the printing hammer operating means.

A further object is to provide means for rendering the printing hammer actuating mechanism inoperable when the printing hammer is inoperative.

A still further object is to provide means for operating a plurality of printing hammer actuating devices in any selective order under control of the printing hammers.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Figure 1:
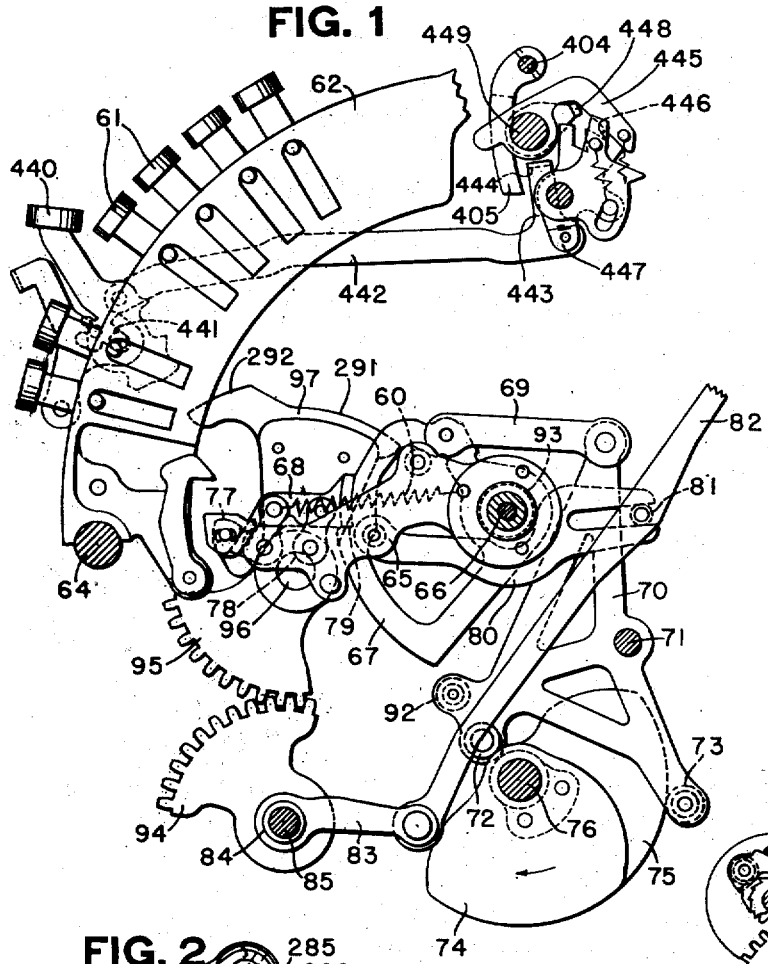
Fig. 1 shows the control key bank and its differential mechanism.

The present invention is illustrated as applied to a machine of the type disclosed in the above-mentioned Shipley and Brand patents. In this type of machine, type carriers are provided, which are adjusted differentially under control of depressible keys. The printing mechanism is adapted to print and issue an itemized receipt, as well as print on a detail strip or on an inserted slip. Three upper printing hammers—viz., item, total, and electro—are provided to make impressions on the receipt paper, while a single lower printing hammer is provided for making impressions on the detail strip.

When the items of a multiple-item transaction or a single-item transaction are printed, all of the hammers except the item hammer, are disabled. The item hammer is wide enough to print from all amount type carriers and from the clerks' and transaction type carriers. The total hammer prints from the remaining type carriers shown in the upper left part of Fig. 9.

When the total of a multiple-item transaction or of a single-item transaction is printed, both the item hammers and the total hammers are operated simultaneously to print from their appropriate type carriers, while the electro hammer is operated at a different time to print the name of the store, the date, and any other desired information. The lower printing hammer is operated at a still different time in the operation to print on the detail strip the total amount, as well as the clerks' and transaction characters.

The usual total control lever is employed herein to condition the machine for single-cycle adding operations and two-cycle total or sub-total operations. The total lever also controls the operativeness of the different printing hammers. For example, when the total lever is in its normal "add" position, all of the printing hammers, except the item hammer, are rendered inoperative. When the total lever is moved to its sub-total position, all of the hammers, except the item hammer, are rendered inoperative. On the other hand, if the total lever is moved to its total position, all of the printing hammers are rendered operative.

Individual operating devices are provided for each of the printing hammers, which devices are adapted to be first retracted against the action of separate springs and then released to the action of said springs to operate their corresponding hammers.

The present invention provides means for retaining said operating devices in their retracted positions to prevent idle operation thereof when the printing hammers are to be inoperative. If the printing hammers have been rendered operative, they will control said means so that the operating devices will not be retained in retracted positions and consequently will be free to operate their corresponding hammers.

Detailed Description

*Keys and differential mechanism*

The keyboard and differential mechanism in the present application is substantially like that shown and described in the previously-mentioned Shipley Patent No. 1,865,147.

Since the amount keys and the differential mechanism associated therewith in the present machine are fully illustrated and described in the above-mentioned Shipley patent, and form no part of the present invention, they are neither shown nor described herein.

Figure 9:
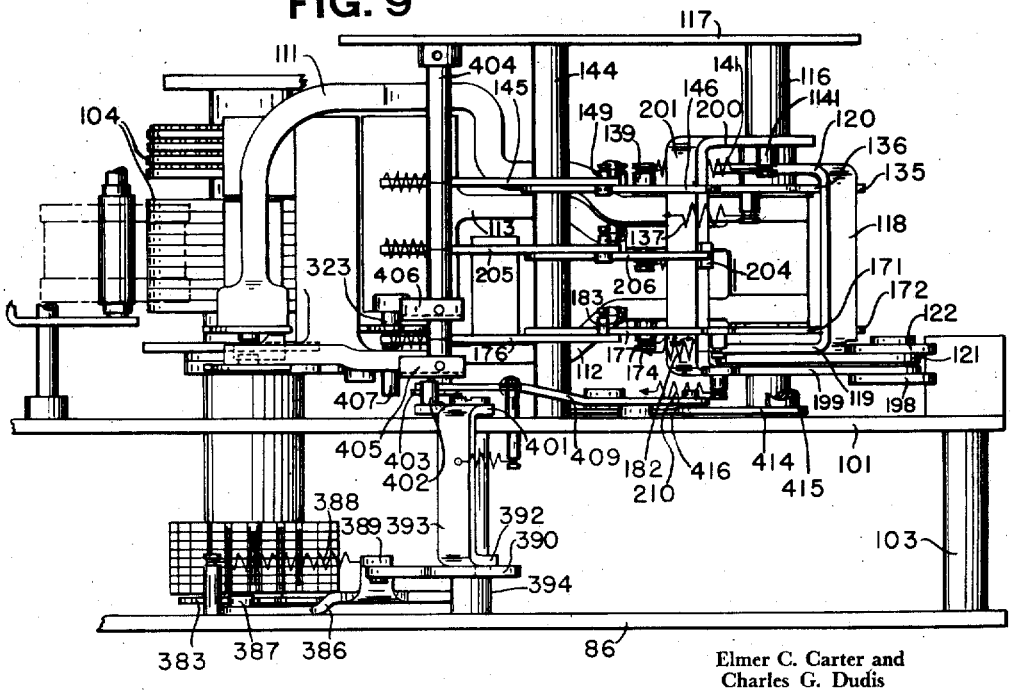
Fig. 9 is a detail plan view of the various upper impression hammers, their operating devices, and the means for retaining said devices in their retracted positions.

Since the control exercised by the total lever over the operativeness of the printing hammers is superseded by the control of what is known as a transaction or control bank of keys, when a no-sale operation is performed, this bank of keys and the differential mechanism associated therewith are illustrated herein (Fig. 1) and will be briefly described. This bank comprises six transaction keys 61 carried by the usual key frame 62 supported on cross rods 63 and 64 mounted in the machine side frames, only one of which (86) is shown (Fig. 9). Beginning with the top transaction key 61 and proceeding downwardly, the keys bear the captions Groceries, Produce, Dairy, Special, Grand total, and No sale. Only the lowermost bar or No sale key 61 is adapted to control means for superseding the control normally exercised by the total lever over the operativeness of the printing hammers, as will be described later.

When any one of the transactions keys 61 is depressed, it is retained in such position by means such as that shown and described in the above-mentioned Shipley patent.

The keys 61 control the setting of the differential mechanism, which in turn controls the setting of type wheels in an old and well-known manner. Briefly, the differential mechanism includes a differentially adjustable arm 65 (Fig. 1) freely mounted on a rod 66 supported by the machine side frames. The arm 65 is releasably connected to a driver 67, freely mounted on the rod 66, by means of the usual latch 68, held against the driver 67 by a spring 60. The driver 67 is connected by a link 69 to a lever 70 pivoted at 71. The lever 70 carries rollers 72 and 73 cooperating with cams 74 and 75, respectively, secured to a main drive shaft 76. The shaft 76 rotates in a clockwise direction and is given one complete revolution during each single-cycle adding operation and two complete revolutions during each total or sub-total operation, as will be described later.

Upon each complete clockwise rotation of the shaft 76, the latter, through the cams 74—75, the lever 70, and the link 69, moves the driver 67 first clockwise and then counter-clockwise. This driver, through the latch 68, carries the differential arm 65 with it until an end of a bell crank 77, which, together with a link 78, supports the latch 68, contacts and is stopped by the inner end of whichever one of the keys 61 is depressed. When this occurs, the latch 68 is withdrawn from a shoulder 79 formed on the periphery of the driver 67, and the latter continues its regular excursion in a clockwise direction. Upon return counter-clockwise movement of the driver 67, the latch 68 again affects the driving connection between the differential arm 65 and the driver 67, under the influence of the spring 69, when the driver reaches the position in which said latch 68 had been disengaged from the driver 67.

The differential arm 65 has pivoted thereto one end of the usual beam 80, the other end of the beam being bifurcated to embrace a stud 81 in a link 82, one end of said link being pivoted to an arm 83 secured to the sleeve 84 on a shaft 85 journaled in the machine side frames.

Considering the parts to be in the positions shown in Fig. 1, the clockwise movement of the differentially adjustable arm 65 moves the left end of the beam 80 upwardly, thus lowering the right end thereof, at the same time lowering the link 82 to rock the arm 83 and the sleeve 84 in a clockwise direction.

To insure that the right end of the beam 80 is positioned correspondingly to the differential setting of the left end thereof, the lever 70 carries a roller 92, which roller contacts the under side of the beam 80, moving it positively, so that its upper edge contacts a collar 93 mounted on the rod 66.

The sleeve 84 has secured thereto a segment 94 meshing with a segment 95 loose on a stud 96 mounted in the left side frame 86 of the machine. The segment 95 has secured thereto a cam arm 97, which is differentially adjusted under control of the transaction keys 61. The cam arm 97 controls means for superseding the control normally exercised by the total control lever over the printing hammers, as will be more fully explained hereinafter. Due to the beam construction for setting the link 82 and the cam arm 97, the cam arm 97 remains in the position in which it was set at the end of the operation of the machine; that is, it does not return to its normal position, due to the fact that the right end of the beam 80 and the link 82 always remain at the end of each operation, in the position in which they were set during that operation.

It is not thought necessary to go into any detailed description of the mechanism for driving the main drive shaft 76, and therefore brief mention will be made as to how this shaft receives its motion. Any well-known drive mechanism may be used to operate this shaft, such as an electric motor of the type illustrated and described in the United States Patent No. 1,144,418, issued to Kettering and Chryst on June 29, 1915.

Sometimes it is desirable to operate the type of machine herein referred to by hand, and for the accomplishment of this purpose the shaft 76 has secured thereon a gear 98 (Fig. 10) meshing with a gear 99, the latter being twice the diameter of the former, and is freely mounted on a screw stud 100 supported in the right-hand machine side frame (not shown). As shown in the previously-mentioned Brand Patent No 1,812,194, this last gear 99 may be given one-half rotation by a manually operable handle, which half-turn gives the gear 98 and the drive shaft 76 a complete clockwise rotation.

*Printing mechanism*

The printing mechanism in machines of the type to which this invention relates is usually located at the left side of the machine. A printer frame 101 (Fig. 9), spaced apart from the left side frame 86 by studs 103 (only one being shown), supports substantially all of the printing mechanism.

Figure 4:
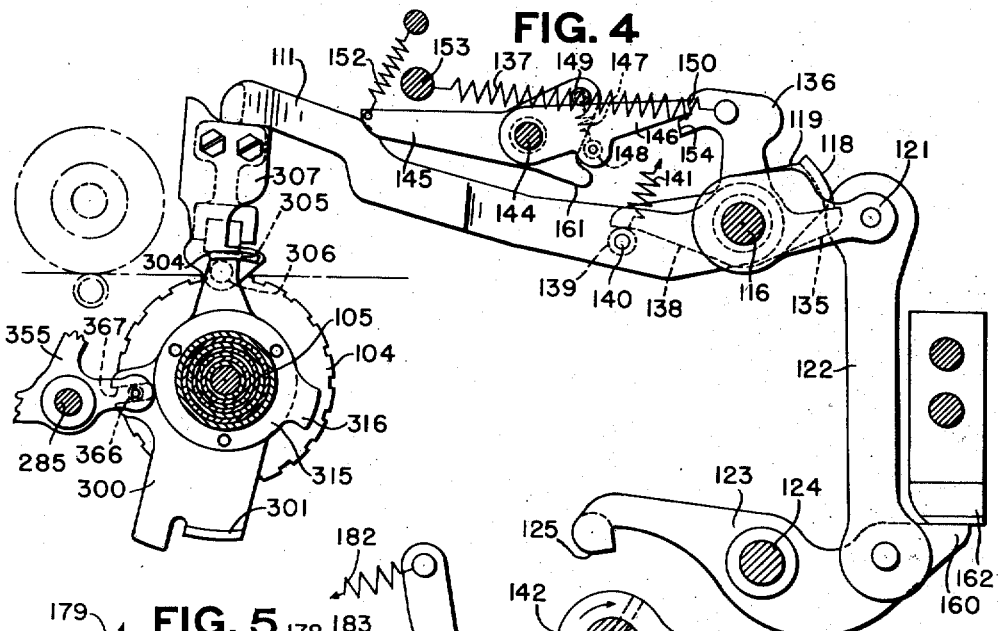
Fig. 4 is a detail view of the item printing hammer and the operating device therefor.
Figure 7:
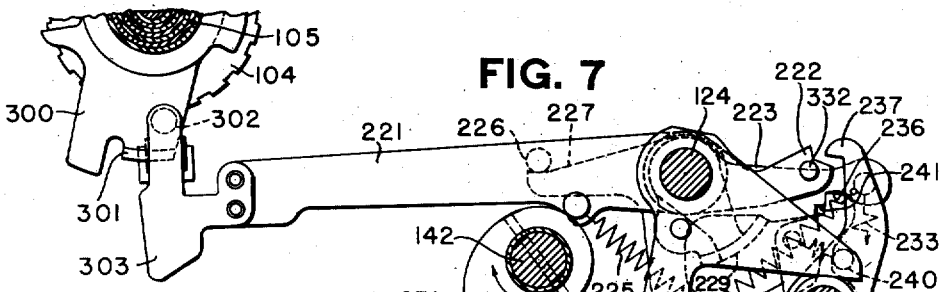
Fig. 7 is a detail view of the lower printing hammer and the operating device therefor, as well as the means for retaining said device in its retracted position.
Figure 11:
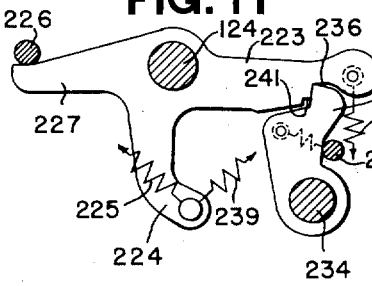
Fig. 11 is a detail of the latching device to control the operation of the lower hammer.

The printing mechanism includes type carriers 104 (Figs. 4, 7, and 9), from which the receipt and the detail strip or slip are printed, certain of such type carriers being adjusted differentially under the control of depressed keys and supported by nested sleeves 105 extending laterally from the left side frame 86 through the printer frame 101, the remaining type carriers being adjusted by any suitable means illustrated and described in the previously-mentioned Shipley and Brand patents.

Three upper printing hammers (Figs. 4, 5, and 9), which include an item hammer 111 and a total hammer 112, are provided to take impressions from the type carriers 104 and print the same on the receipt. An electro hammer 113 takes impressions from an electrotype plate (not shown). Two cams 114 and 115 (Figs. 4 and 6) are provided to actuate these three hammers, the cam 114 being adapted to actuate the electro hammer 113, and the cam 115 being adapted to actuate the item hammer 111 and the total hammer 112. The connection between the cam 115 and the hammers 111 and 112 will be described presently. A lower printing hammer 221 (Fig. 7) is provided for taking impressions from the type carriers and printing the same on a detail strip or inserted slip. A cam 231 is provided for effecting the actuation of the hammer 221.

*Item and total hammer operating mechanism*

The item hammer 111 and the total hammer 112 are pivoted on a rod 116 (Figs. 4, 6, and 9) secured in the printer frame 101 and an auxiliary frame 117 supported by studs mounted on the frame 101. A bail 118, connecting arms 119 and 120, free on the rod 116, is provided for use in connection with the operation of the hammers 111 and 112. Loosely mounted on the rod 116 and secured to the arm 119 of the bail 118 is an arm 121, which is connected by a link 122 to an operating lever 123 pivotally mounted on a stud 124 secured to the printer frame 101. The lever 123 is provided with a nose 125 adapted to cooperate with the cam 115.

The bail 118 overlies a finger 135 of an operating arm 136 freely mounted on the rod 116. A spring 137 constantly tends to rock the arm 136 counter-clockwise, thus maintaining the finger 135 in cooperative relationship with the bail 118. The arm 136 also has a forwardly extending arm 138 adapted to coact with a roller 139 loosely mounted on a stud 140 secured to the hammer 111. A spring 141 (Figures 4 and 9) normally tends to rock the hammer 111 clockwise, but the arm 138 normally coacts with the roller 139 to limit such movement to such an extent that the platen of the printing hammer 111 is maintained in a position just clear of the type carrier 104.

One end of the spring 141 is connected to the stud 140, and its other end is connected to the stud 1141 (Figs. 6 and 9) on an arm 200 of a yoke 201, hereinafter described, which yoke is carried by the rod 116.

The cam 115 (Fig. 4) is secured to a printer drive shaft 142 journaled in the left side frame 86 and the printer side frame 101. The shaft 142 is given one complete clockwise rotation during each cycle of operation of the machine by the train of gears 130, 131, and 132 (Fig. 10) driven by the shaft 76. Upon the clockwise rotation of the shaft 142, a lobe 143 on the cam will coact with the nose 125 to rock the lever 123 clockwise, whereupon the link 122, the arm 121, and the bail 118 will rock the arm 136 clockwise against the action of the spring 137. Assuming that the item hammer 111 has been rendered inoperative at this time, by means to be described later, the arm 138 will move away from the roller 139, but the spring 141 will not rock the hammer 111 clockwise, since it has been rendered inoperative. Pivotally mounted on a rod 144, carried by the printer frame 101 and the auxiliary frame 117, are an arm 145 and a pawl 146, resiliently connected together by a spring 147 secured to a stud 148 in the pawl 146 and to a stud 149 in the arm 145, thus normally maintaining the pawl 146 against the stud 149. The free end of the pawl 146 normally engages a notch 150 in the arm 136. A spring 152 constantly tends to rock the arm 145 and, through the stud 149, the pawl 146 clockwise, but is normally prevented from doing so by the engagement of the pawl 146 with the notch 150 in the arm 136.

However, when the arm 136 is rocked clockwise by the cam 115, as described above, the spring 152 will rock the arm 145 and the pawl 146 clockwise until the arm 145 strikes a rod 153 supported in the frames 101 and 117. This clockwise movement of the pawl 146 positions the free end thereof in front of a finger 154 on the arm 136, thus preventing counter-clockwise return movement of the arm 136 under influence of its spring 137.

Therefore, when the lobe 143 clears the nose 125, the spring 137 cannot function to operate the hammer 111 and the lever 123. The link 122, the arm 121, the bail 118, and the arm 136 will be held in their cocked or retracted positions by the pawl 146 until an operation of the machine in which the printing hammer 111 is rendered operative.

With such an arrangement, all idle operations of the operating means for the printing hammer 111 are eliminated, thereby reducing the amount of wear and strain on the parts constituting such means, as well as greatly reducing the noise incident to their operation.

It is during the first cycle of a total operation that the hammer 111 is rendered inoperative, by means described later, and it is during such cycle that the end of the pawl 146 is moved in front of the finger 154 (Fig. 4) of the operating arm 136, and, at the same time a finger 161 of the arm 145 is moved into contact with the upper surface of the hammer 111.

During the second cycle of the total operation, when the lobe 143 strikes the nose 125 of the lever 123, the hammer 111 and the arm 136 are moved slightly. The hammer 111, through the finger 161, rocks the arm 145 counter-clockwise and stretches the spring 147, and, just before the lobe 143 passes off the nose 125, the arm 136 is moved just enough to relieve the pressure on the end of the pawl 146, whereupon the tensioned spring 147 rocks the pawl 146 counter-clockwise, again placing its end in front of the notch 150. Therefore, when the lobe 143 passes off the nose 125, the spring 137 rocks the arm 136 counter-clockwise very rapidly, and the arm 138, through the roller 139, rocks the hammer 111 with sufficient force to cause it to print from the type carriers 104.

If, on the other hand, the printing hammer 111 had been operative at the time the arm 136 was rocked clockwise, as described above, said hammer 111 would have been rocked clockwise by the spring 141. During such clockwise movement of the hammer 111, the upper edge thereof would have coacted with the finger 161 and prevented the spring 152 from rocking the arm 145 and the pawl 146 clockwise, thus maintaining the latter arm opposite the notch 150. This permits the arm 136, after the lobe 143 has cleared the nose 125, to be rocked rapidly counter-clockwise by the spring 137 to impart the necessary counter-clockwise movement to the printing hammer 111 to take an impression from the type carriers 104.

The counter-clockwise movement given to the arm 136 by the spring 137 is limited by a finger 160 of the lever 123 striking a stationary block 162, and the hammer 111 continues on under momentum to make the print.

It will also readily be seen from the above that cooperation of the pawl 146 with the arm 136 prevents any rebound of the printing hammer 111, which might result in an accidental operation thereof. It is therefore possible in the present invention to eliminate the usual rebound-preventing pawls used in printing mechanism of this type.

Figure 5:
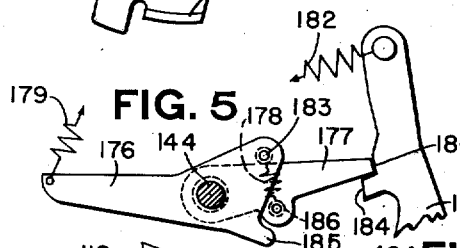
Fig. 5 is a detail view of a portion of the actuating device for the electro total printing hammer, together with the means for retaining said device in its retracted position.
Figure 6:
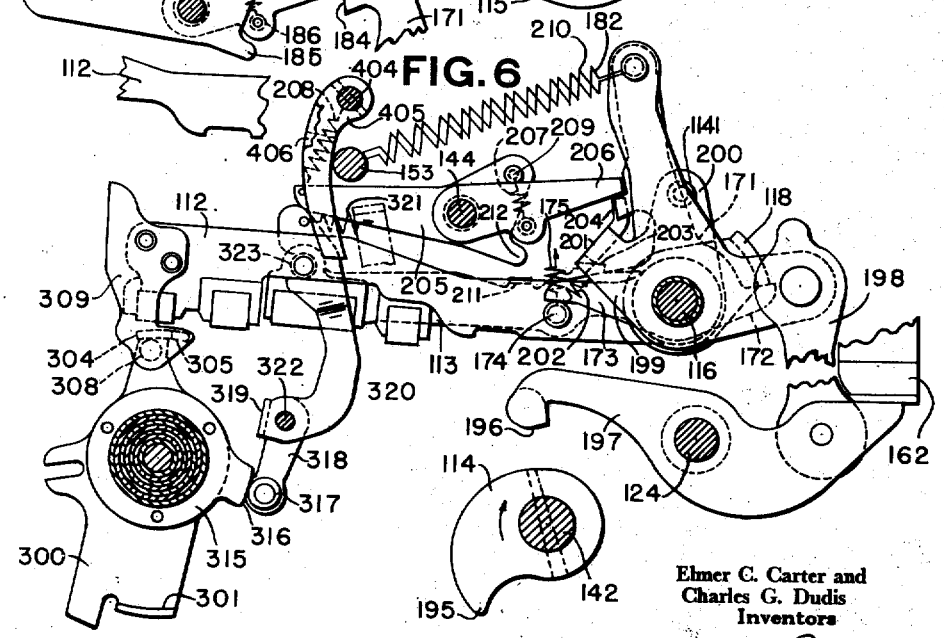
Fig. 6 is a detail view of the operating device for the electro printing hammer, together with the means for retaining said device in its retracted position.

The total hammer 112 is actuated by the cam 115 in the same manner as just described for the item hammer 111. The total hammer 112 has associated therewith an operating arm 171 (Figs. 5 and 6). The arm 171 has a finger 172 cooperating with the bail 118. An arm 173 integral with the arm 171 cooperates with a stud 174 on the total hammer 112. A spring 175 normally holds the stud 174 against the arm 173.

Also associated with the total hammer 112 are an arm 176 and a pawl 177, resiliently connected together by a spring 178. A spring 179 constantly tends to rock the arm 176 and the pawl 177 clockwise but is normally prevented from doing so by the engagement of the end of the arm 176 with a notch 180 of the arm 171.

Upon the clockwise rotation of the cam 115, the lobe 143 rocks the lever 123 and the bail 118 clockwise, as described above, whereupon said bail 118, through the finger 172, rocks the arm 171 clockwise against the action of a spring 182. If at this time the total hammer 112 is inoperative, the spring 179 will rock the arm 176 clockwise and, through a stud 183 carried thereby, will rock the pawl 177 clockwise to position the free end thereof in front of a finger 184 on the arm 171 to prevent counter-clockwise return movement of said arm 171 under the influence of its spring 182.

Therefore, when the lobe clears the nose 125, thereby releasing the lever 123 and the bail for return to their normal positions, the pawl 177, being in front of the finger 184, will prevent the spring 182 from rocking the arm 171 counter-clockwise, and the total hammer 112 will be held in its cocked or retracted positions.

The pawl 177 (Fig. 5) is released from the finger 184 in the same manner that the arm 146 is released from the finger 154.

During the second cycle of a total operation, the upper side of the hammer 112, through a finger 185 on the arm 176, rocks said arm and tensions the spring 178 and then, when the arm 171 relieves the pressure between the end of the pawl 177 and the finger 184, the tensioned spring 178 rocks the pawl 177 counter-clockwise to place it opposite the notch 180. Now, when the lobe 143 clears the nose 125 on the lever 123, the spring 182 will rock the arm 171 and the lever 123 counter-clockwise until the finger 160 of the lever 123 strikes the block 162. Upon such rapid clockwise movement of the arm 171, the arm 173, through the stud 174, actuates the total hammer 112, in the same manner as described above for the item hammer 111, to take an impression from the type carriers 104.

If, on the other hand, the total hammer 112 had been operative when the arm 171 was rocked clockwise, as mentioned above, the spring 178 would have rocked the total hammer 112 clockwise until the upper edge thereof contacted the finger 185 and rocked the arm 176 slightly counter-clockwise against the action of a spring 179 to maintain the pawl 177 in its normal position in front of the notch 180, so that the hammer 112 would operate to print.

It will be seen from the foregoing that the item hammer 111 and the total hammer 112 each controls the effectiveness of its respective operating arm 136 and 171. The means by which the total lever controls the operativeness of the hammers 111 and 112 will be described hereinafter.

*Electro printing hammer operating mechanism*

A separate train of mechanism is provided to actuate the electro hammer 113. This train of mechanism is the same in principle of operation as that previously described herein for the item hammer 111 and the total hammer 112.

Associated with the electro hammer 113 is a cam 114 (Fig. 6), which is also secured to the shaft 142. The cam 114 is provided with a lobe 195 adapted to coact with a nose 196 on an operating lever 197 pivoted on the stud 124. The lobe 195 is so located on the cam 114 that the lever 197 will be actuated thereby before the lever 123, associated with the item hammer 111 and the total hammer 112 is actuated by the cam 115. By such arrangement, the electro printing hammer 113 is operated at a different time in the operation from the time at which the item hammer 111 and the total hammer 112 are operated; thus a certain amount of the noise incident to the simultaneous operation of all three hammers is eliminated, and a better distribution of the load placed on the machine operating mechanism is effected.

The lever 197 is connected by a link 198 to an arm 199, pivoted on the rod 116, and is connected to another arm 200 by a bail 201. A spring 202 normally maintains the hammer 113 in a position where a lug 203 thereon rests against the under side of the bail 201. The bail 201 has a finger 204 on the upper edge thereof. Pivotally mounted on the rod 144 are an arm 205 and a pawl 206 resiliently connected together by a spring 207. A press 208 constantly tends to rock the arm 205 and the pawl 206 clockwise. The arm 205 carries a stud 209, which coacts with the upper edge of the pawl 206 to rock the latter clockwise when the arm 205 is so rocked by the spring 208. The pawl 206, however, normally rests on top of the finger 204 and is thereby held against clockwise movement by the spring 208, as is also the arm 205.

It will thus be seen from the above that, when the lever 197 is rocked clockwise by the cam 114, the arms 199 and 200 and the bail 201 will likewise be rocked clockwise, against the action of a spring 210 fastened to the arm 199 and to the rod 153. Upon such clockwise movement of the bail 201, the finger 204 will be moved from beneath the pawl 206, thereby releasing the arm 205 and the pawl 206 for clockwise movement by the spring 208. Whether or not the arm 205 and the pawl 206 receive such clockwise movement at this time is determined by the operativeness of the electro hammer 113. If the hammer is operative, the spring 202 will rock the hammer 113 clockwise at the same time the bail 201 receives such movement. When this occurs, a surface 211 formed on the upper edge of the hammer 113 will coact with a finger 212 on the arm 205 to rock the arm 205 slightly counter-clockwise to prevent clockwise movement of the arm 205 by the spring 208, thereby maintaining the pawl 206 in its normal position above the path of travel of the finger 204 on the bail 201. It will, therefore, be seen that, when the lobe 195 on the cam 114 clears the nose 196 on the lever 197, the latter, together with the bail 201, will be given a rapid counter-clockwise movement by the spring 210, such movement of the lever 197 being limited by the rear arm thereof striking the block 162. During such counter-clockwise movement of the bail 201, the lower edge thereof will coact with the lug 203 to impart a like movement to the electro hammer 113 to cause the latter to take an impression from the type carriers 104.

If, on the other hand, the electro hammer 113 is inoperative at the time the bail 201 is rocked clockwise, the spring 208 will rock the arm 205 clockwise until the left end thereof strikes the rod 153, thus rocking the pawl 206 clockwise to position the free end thereof directly in the path of movement of the finger 204 to prevent counter-clockwise movement of the bail 201. Therefore, when the lobe 195 clears the nose 196, the lever 197 and the bail 201 will be retained in their retracted positions by the pawl 206, against the action of the spring 210, to render the electro hammer operating means inoperable when said hammer has been previously rendered inoperative.

During the second cycle of a total operation, the end of the pawl 206 is released from the finger 204 by the hammer 112 contacting the finger 212 and rocking the arm 205 to tension the spring 207 so that, when the pressure between the finger 204 and the end of the pawl 206 is removed, the tensioned spring 207 will rock the pawl 206 away from the finger 204 to permit operation of the electro hammer 113.

*Detail strip lower printing hammer operating mechanism*

A lower printing hammer 221 (Fig. 7) is provided for taking an impression from the type carriers 104 and printing the same on a detail strip. This hammer 221 is pivoted on the stud 124 and has a rearwardly extending arm 222. Also pivotally mounted on the stud 124 is an arm 223 having an integral arm 224 connected by a spring 225 to the hammer 221. The hammer 221 carries a stud 226, which is normally held by the spring 225 against another arm 227 integral with the arm 223. Pivoted on the stud 124 is an operating arm 228 secured to a bail 229 also pivoted on the stud 124. The bail 229 underlies the arm 223.

Upon clockwise rotation of the shaft 142, a lobe 230, on a cam 231 secured to said shaft, will contact and rock the arm 228, the bail 229, and the arm 223 counter-clockwise against the action of a spring 233 to hold the same against the bail 229.

Pivotally mounted on a stud 234 in the printer frame 101 is a latch 235, which normally engages a surface 236 on the arm 223. Also pivotally mounted on the stud 234 is a hook 237 resiliently connected to the latch 235 by a spring 238. A spring 239, connected to the hook 237 and to the arm 224, normally urges the hook 237 counter-clockwise and, through a stud 240 on the hook 237 coacting with the edge of the latch 235, tends to move said latch 235 counter-clockwise.

As the bail 229 and the arm 223 are rocked counter-clockwise, as described above, the surface 236 is moved away from the latch 235, whereupon the spring 239 rocks the hook 237 and the latch 235 counter-clockwise, to engage the latter with another surface 241 on the arm 223. If the hammer 221 is inoperative at this time, the arm 223 will be retained in its retracted position, through the engagement of the latch 235 with the surface 241, until such time as the hammer 221 is rendered operative. It will thus be seen that idle operation of this hammer operating means is prevented.

The printing hammer 221 is rendered operative only when printing totals, which necessitates a two-cycle operation of the machine. When this occurs, the hammer 221 remains inoperative during the first cycle of said operation and is rendered operative during the second cycle of said operation. During the first cycle of a total operation, while the hammer 221 is inoperative, the operating means therefor is retained in its retracted position in the manner above described. However, when the cam 231 is again rotated clockwise during the second cycle of said operation, the lobe 230 thereon will actuate the arm 228 and the bail 229 to impart a slight counter-clockwise movement to the arm 223. However, before the arm 223 receives such slight counter-clockwise movement, the printing hammer 221, being rendered operative at this time, is rocked counter-clockwise by the spring 225, whereupon the arm 222 will rock the hook 237 clockwise. The spring 238 is strong enough to carry the latch 235 with the hook 237. Therefore, the slight counter-clockwise movement imparted to the arm 223, as mentioned above, is for the purpose of facilitating the disengagement of the latch 235 from the surface 241, by the hook 237, under the action of the spring 238, to release the arm 223 for rapid clockwise movement by the spring 239. When this occurs, the arm 227, coacting with the stud 226, imparts the necessary clockwise movement to the hammer 221 to take an impression from the type carriers 104.

*Selective means for controlling operativeness of printing hammers*

As is customary in machines of the type to which the present invention is applied, selective means is provided for conditioning the machine for single-cycle adding operations and two-cycle total or sub-total operations, which means also controls the operativeness of the printing hammers during such different kinds of operations.

This selective means includes the usual total control lever 251 (Fig. 10), which has several different positions of adjustment, such as its normal add position, sub-total position, and total position. The lever 251 has a slot 252, into which projects a pin 253 on a lever 254 pivoted at 255. Also pivoted at 255 is an arm 256 having a stud 257, which is normally held in contact with the upper end 258 of the lever 254 by a spring 259. The lever 254 and the arm 256 together form a slot 260, into which projects a roller 261 carried by an arm 262 secured to a shaft 263

Figure 10:
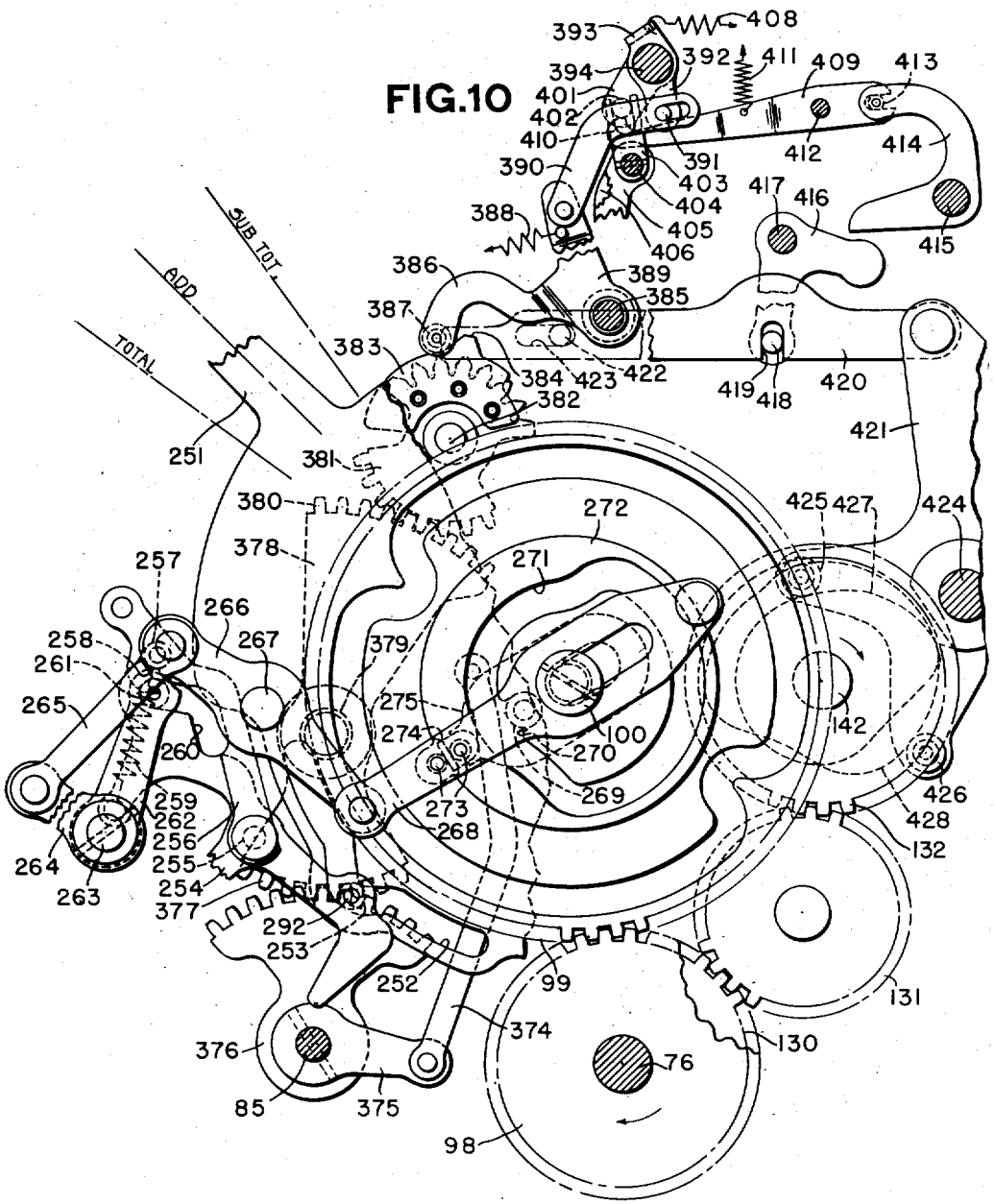
Fig. 10 is a detail view of the total lever and means controlled thereby for controlling the operativeness of the various printing hammers, together with other means also controlled by said lever to supersede the control of the first-mentioned means during sub-total operations.

In Fig. 10, the total lever 251 is shown in its "add" position. Movement of the total lever upwardly to take a sub-total, or downwardly to take a total, through the cam slot 252, the lever 254, and the arm 256, rocks the arm 262 and the shaft 263 in a clockwise direction. Also secured to the shaft 263 is an arm 264 connected by a link 265 to a lever 266 pivoted at 267 to the side frame (not shown) of the machine. Connected to the lever 266 is a pitman 268 slotted to surround the screw stud 100. This pitman carries a roller 269 normally resting in an offset 270 of a cam race 271 in a disk 272. The pitman 268 also has two pins 273 projecting on either side of a flange 274 formed on a coupling slide 275, which is adapted to couple the cam disk 272 to the gear 99.

The above-mentioned clockwise movement of the shaft 263 by the total lever 251 will, through the connection shown in Fig. 10, move the pitman 268 toward the left to move the coupling slide 275 to couple together the gear 99 and the disk 272 so that they will operate in unison in a manner fully illustrated and described in the United States Letters Patent No. 1,242,170, granted October 9, 1917, to Frederick L. Fuller.

Also, when the total lever 251 is moved from its adding position into a position to take either a total or a sub-total, an arm 281 (Fig. 2) fast on the shaft 263 moves a pitman 282 to the right. This pitman carries a roller 283 and, by its contact with an arm 284 fast on a printer control shaft 285, moves the latter clockwise to control mechanism for controlling the operativeness of the printing hammers, as will be more fully explained hereinafter.

After the parts have thus been manually moved into such positions, the gear 99 is given a complete rotation in a counter-clockwise direction, thus causing the drive shaft 76 to be given two complete clockwise rotations for such total or sub-total operation. As the disk 272 is now coupled to the gear 99, the cam race 271, near the end of the first cycle of said operation, rocks the shaft 263 still farther clockwise to effect a further adjustment of the means for controlling the operativeness of the printing hammers, as will be described later.

It will be recalled that the cam arm 97 (Figs. 1 and 2) is adjusted during adding operations into a position determined by the keys 61. This arm 97 cooperates with a roller 286 on an arm 287 loose upon the shaft 285. The arm 287 has an angular slot, into which projects a roller 288 carried by a link 289, which roller 288 also projects through a straight slot in an arm 290 fast on the shaft 285.

Figure 2:
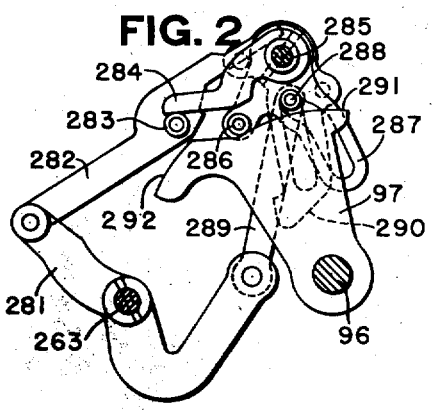
Fig. 2 is a detail of the means controlled by the control keys for superseding the control exercised by the total control lever over the operativeness of the printing hammers.

Depression of any of the four uppermost keys 61 (Fig. 2) causes the cam arm 97 to be set so that the roller 286 will coact with a lower edge 291 of said cam arm 97, as viewed in Fig. 2, and therefore cause no movement of the arms 287 and 290, nor of the shaft 285. Fig. 1 shows the cam arm 97 in the position to which it is adjusted under control of the two lowermost keys 61, as seen in said figure, which are the "Grand total" and No-sale" keys. When the arm 97 is set in this position, a higher edge 292 thereof cooperates with the roller 286 to rock the arm 286 and, through the roller 288, the arm 287 and the shaft 285 clockwise, which movement of the shaft 285 corresponds to the movement given to said shaft during the second cycle of a total or sub-total operation to render all of the printing hammers operative, as will be further explained hereinafter.

In the present machine, it is desirable to print both on the receipt and on the detail strip each time a "No-sale" operation is performed. It will be seen from the above that, when the "No-sale" key 61 is depressed, the control normally exercised by the total lever 251 over the operativeness of the printing hammers during a single-cycle operation will be superseded by the control exercised over said hammers by the cam arm 97 under control of the "No-sale" key. Since the "Grand total" key 61 is depressed only when the total lever 251 is positioned in its total position, said "Grand total" key will not control means to supersede the control normally exercised by said lever over the operativeness of the printing hammers.

The means by which the total lever 251 and the "No-sale" key 61 control the operativeness of the printing hammers includes a hammer control lever 300 (Figs. 4, 6, and 7) pivoted on the outer one of the nested sleeves 105. This lever 300 has a flange 301 adapted to cooperate with a stud 302 on an arm 303 (Fig. 7) secured to the lower printing hammer 221. A flange 304, formed on the upper end of the lever 300, has an extension 305, which is adapted to cooperate with a stud 306 (Fig. 4) projecting laterally from an arm 307 secured to the item printing hammer 111. The flange 304 also cooperates with a stud 308 on an arm 309 secured to the total printing hammer 112 (Fig. 6). The extension 305, which cooperates with the stud 306 on the arm 307 of the item hammer 111, is shorter than the oppositely-extending flange 304, which cooperates with the stud 308 on the arm 309 of the total hammer 112, the two studs 306 and 308 being spaced apart from each other and extending laterally toward each other. The hammer control lever 300 extends into the space between the two studs 306 and 308 on the parallel arms 307 and 309 of the item hammer 111 and the total hammer 112.

When the total control lever 251 is in its "add" position, for all operations except a "No-sale" operation, the flange 301 (Fig. 7) cooperates with the stud 302 on the lower hammer arm 303 to prevent operation of the detail printing hammer 221. Also the flange 304 cooperates with the stud 308 to prevent operation of the total hammer 112, but the extension 305, being shorter than the flange 304, does not lie above the stud 306, and consequently the item hammer 111 is free to operate during such adding operations.

The electro hammer 113 is also rendered inoperative by the hammer control lever 300 in a manner now to be described. A disk 315 (Figs. 4 and 6), pinned to the lever 300, is provided with a projection 316, which is normally positioned in the path of travel of a stud 317 carried by an arm 318 connected by a bail 319 to an arm 320 normally urged clockwise by a spring 321. The arms 318 and 320 are pivotally mounted on a stud 322 carried by the printer frame 101. The arm 320 has a notch adapted to coact with a stud 323 on the electro hammer 113. As long as the hammer control lever 300 is in the position shown in Fig. 6, the notch in the arm 320 engages the stud 323, thus rendering the electro hammer 113 inoperative.

It will thus be seen from the above that, during all adding operations except a No-sale operation, the flanges 301 and 304 on the lever 300 render the lower printing hammer 221 and the total hammer 112 inoperative, while the projection 316 on the disk 315 renders the electro hammer 113 inoperative. However, such means has no effect on the item hammer 111 at this time.

Figure 3:
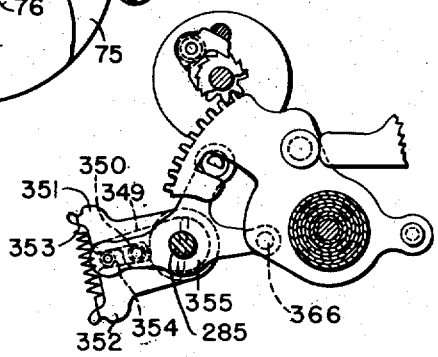
Fig. 3 is a detail view of a portion of the means for controlling the operativeness of the printing hammers.

The means for controlling the positioning of the hammer control lever 300 and the disk 315 is old and well known in the art and will therefore be only briefly described herein. The shaft 285 (Fig. 3) has secured thereto an arm 349, which carries a stud 350, which projects between a pair of arms 351 and 352 journaled on the shaft 285 and held against the stud 350 by a spring 353. A stud 354, carried by the forward arm of a lever 355 pivoted on the shaft 285, also projects between the pivoted arms 351 and 352.

When a total operation is to be performed, the total lever 251 is moved downwardly to its total position, which imparts a clockwise movement to the shaft 285, as previously described, as well as to the arm 349 secured thereon. Such clockwise movement of the arm 349 is transmitted by the stud 350 to the arm 351, thence through the spring 353 to the arm 352, which contacts the stud 354 to rock the lever 355 clockwise. A stud 366, carried by a rearwardly extending arm of the lever 355, is embraced by a notch 367 (Fig. 4) formed in the hammer control lever 300, whereby clockwise movement of the lever 355 is transmitted to the control lever 300 to rock the latter counter-clockwise. The counter-clockwise movement thus imparted to the lever 300, as well as to the disk 315 secured thereto, by the total control lever 251, when the latter is moved from its add position to its total position, is insufficient to move the flanges 301 and 304 out of cooperative relation with their respective studs 302 and 308 on the arms 303 and 309, respectively, thus releasing the hammers 221 and 112 for operation.

Also, the projection 316 on the disk 315, the latter being moved with the lever 300, has not been moved out of cooperative relationship with the stud 317 (Fig. 6) on the arm 318, thus, maintaining the arm 320 in engagement with the stud 323 on the electro hammer 113. Therefore, the lower hammer 221, the total hammer 112, and the electro hammer 113 will remain inoperative during the first cycle of said two-cycle total operation. However, the extension 305 on the flange 304, which normally occupies a position out of the path of movement of the stud 306 on the arm 307, is shifted by this counter-clockwise movement of the lever 300 into its effective position above the stud 306, thereby rendering the item hammer 111 also inoperative during the first cycle of said total-taking operation.

Near the end of the first cycle of such total-taking operation, the shaft 285 is given an additional clockwise movement, which, through the mechanism described above, imparts an additional counter-clockwise movement to the hammer control lever 300 and to the disk 315, to render all of the printing hammers operative during the second cycle of said operation. This is accomplished by said additional counter-clockwise movement of the shaft 285, which is imparted to the lever 300 and to the disk 315 and is sufficient to carry the flanges 301 and 304, the extension 305, and the projection 316 out of cooperative relationship with the studs 302, 308, 306, and 317, respectively, thereby rendering the lower hammer 221, the total hammer 112, the item hammer 111, and the electro hammer 113 operative.

During a single-cycle "No-sale" operation, the cam arm 87, which is adjusted under control of the No-sale key 61, cooperates with the roller 286 to cause the shaft 285 to be rocked clockwise, as described previously. The clockwise movement which the shaft 285 receives under control of the No-sale key 61 is sufficient to render all of the printing hammers 221, 111, 112, and 113 operative in the same manner as just described for a total-taking operation.

During a sub-total operation, all of the printing hammers 111, 112, 113, and 221 are inoperative during the first cycle of said sub-total operation, while during the second cycle only the item hammer 111 is operative to print the amount of the sub-total on the receipt. The manner in which all of said hammers are rendered inoperative during the first cycle of such operation is the same as that employed during the first cycle of a total operation, as described previously; in fact, the hammer control lever 300 and the disk 315 receive the same adjustments during sub-total operations as they do during total operations. However, means is provided for maintaining the total hammer 112, the electro hammer 113, and the lower hammer 221 inoperative during the second cycle of said sub-total operation, after the control lever 300 and the disk 315 have been rocked sufficiently counter-clockwise to normally render said hammers operative. This means will now be described.

When the total control lever 251 is moved from add position to sub-total position, as viewed in Fig. 10, it will, through a link 374, rock an arm 375 counter-clockwise. Since the arm 375 is secured to the shaft 85, it will transmit such counter-clockwise movement to said shaft as well as to a gear segment 376 secured to the shaft. The segment 376 meshes with teeth 377 of a segment lever 378 freely mounted on a rod 379 supported by the machine side frames 86 and the printer frame 101. The upper end of the segment lever 378 has teeth 380 meshing with the teeth of a partial gear 381 freely mounted on a rod 382 supported in the machine side frames. Secured to the gear 381 is a cam plate 383 having a high spot 384 formed on the periphery thereof.

It will thus be seen from the above that the counter-clockwise movement given to the segment 376 will, through the segment lever 378, rock the gear 381 and the plate 383 counter-clockwise.

Freely mounted on a shaft 385 journaled in the machine side frames is an arm 386 carrying a roller 387. A spring 388, secured to an extension 389 of the arm 386, constantly urges said arm counter-clockwise to maintain the roller 387 in cooperative relationship with the periphery of the cam plate 383. The extension 389 has pivoted thereto one end of a link 390, the other end of said link being slotted to engage a stud 391 on an arm 392 of a yoke 393 (Fig. 9) loosely mounted on a rod 394 secured in the left side frame 86 and the printer frame 101. Another arm 401 of the yoke 393 carries a stud 402, which is embraced by the bifurcated portion of an arm 403 pinned to a shaft 404 journaled in the printer frame 101 and the auxiliary frame 117. Also pinned to the shaft 404 is a pair of arms 405 and 406, which are adapted to be moved into the path of movement of studs 407 and 323 on the total hammer 112 and the electro hammer 113, respectively.

It will be seen from the foregoing that, when the total control lever 251 is moved to its sub-total position, the cam plate 383 will be moved counter-clockwise, causing the high spot 384 thereon to coact with the roller 387 to rock the arm 386 clockwise against the action of the spring 388. As long as the total control lever 251 remains in the sub-total position, the cam plate 383 will be positioned so that the high spot 384 will remain in cooperative relationship with the roller 387 to maintain the arm 386 in its moved position. A spring 408 constantly tends to rock the yoke 393 clockwise, but is normally prevented from doing so by the arm 386, through the extension 389 and the link 390. When the arm 386 is rocked clockwise, as described above, it will, through the link 390, rock the arm 392, the yoke 393, and the arm 401 counter-clockwise. When this occurs, the arm 401, through the stud 402, the arm 403, and the shaft 404, will rock the pair of arms 405 and 406 clockwise (Figs. 6 and 10) to position the lower ends of said arms directly above and in the path of travel of the studs 407 and 323 on the total hammer 112 and the electro hammer 113, respectively, to render the same inoperative during the entire sub-total operation.

Means is provided for maintaining the arms 405 and 406 in their effective positions during both cycles of said sub-total operation, and they are not returned to their normal ineffective positions until shortly after the beginning of the next adding or total-taking operation. The means for accomplishing this result will now be described.

Associated with the stud 402 on the arm 401 is a lever 409 (Fig. 10) having one end thereof formed in the shape of a hook 410, which normally bears against the under side of the stud 402, under the influence of a spring 411. When the arm 401 is rocked counter-clockwise, to render the arms 405 and 406 effective, the lever 409 will be rocked clockwise by the spring 411 to engage the hook 410 thereof with the stud 402, to maintain said arms in their effective positions until the next adding or total-taking operation of the machine. The lever 409, which is pivotally mounted on a stud 412 in the printer frame 101, is bifurcated at its other end to embrace a stud 413 of a lever 414 freely mounted on a stud 415 carried by the printer frame 101. The lower arm of the lever 414 lies in the path of travel of one arm of a bell crank 416 freely mounted on a stud 417 in the printer frame 101. The other arm of the bell crank 416 carries a stud 418 embraced by a notch 419 formed in the under side of a slide 420. The slide 420 is pivoted at its right-hand end to a lever 421 and is guided at its opposite end by a pin 422 projecting from the printer frame 101 through a slot 423 in said slide. The lever 421 is pivoted on a stud 424 supported by the left side frame 86 of the machine and the printer frame 101, and carries two rollers 425 and 426, which coact with cams 427 and 428, respectively, secured to the printer drive shaft 142.

During each cycle of operation of the machine, the cams 427 and 428 oscillate the lever 421 to rock the bell crank 416 first counter-clockwise and then clockwise to its normal position. The bell crank 416 will, upon such counter-clockwise movement, coact with the lever 414 to rock the lever 409 counter-clockwise against the action of the spring 411. If at this time the arms 405 and 406 are being maintained in their effective positions by the engagement of the hook 410 with the stud 402 on the arm 401, such counter-clockwise movement of the lever 409 will disengage the hook 410 from the stud 402, thus permitting the spring 408 to rock the yoke 393 clockwise to return the arms 405 and 406 to their normal ineffective positions away from the studs 407 and 323 of the total hammer 112 and the electro hammer 113, respectively.

The means for maintaining the lower printing hammer 221 inoperative during the second cycle of the sub-total operation, after the lever 300 and the disk 315 have been positioned to render said hammer operative, is the same as that illustrated in Figs. 9 and 10, as well as fully described, in the Gruver patent hereinbefore referred to and reference may be made to such patent for a full understanding of this means.

Figure 8:
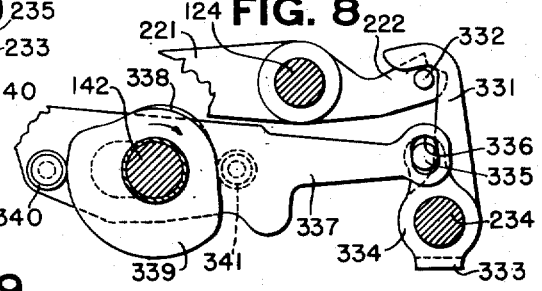
Fig. 8 is a detail view of the means for maintaining the lower printing hammer in the proper position for means to coact therewith to control its operativeness.

After the lower printing hammer 221 is operated to make an impression, the stud 226 (Fig. 7), under the influence of the spring 225, rests on the arm 227 of the operating arm 223. In order to prevent the hammer 221 from being positioned so that the stud 302 will be in the path of movement of the flange 301 when the latter is to be rocked beneath the stud to render the hammer inoperative, means is provided for slightly raising the hammer. This means includes a hook-shaped arm 331 (Fig. 8), which normally coacts with a stud 332 on the rear end of the hammer 221 to maintain the latter in a position so that the stud 302 will be above and out of the path of movement of the flange 301 on the control lever 300. The arm 331 is connected by a bail 333 to another arm 334, such bail and arm being pivotally mounted on the stud 234. The arm 334 carries a stud 335, which projects through a slot 336 in a pitman 337 slidably mounted on the printer drive shaft 142. A pair of cams 338 and 339 fast on the shaft 142 cooperate with a pair of rollers 340 and 341, respectively, on the pitman 337 and normally hold the pitman in its extreme left-hand position, as viewed in Fig. 8. During each cycle of operation of the machine, just before the lobe 230 coacts with the arm 228 to effect the retraction of the hammer-operating arm 223, the cams 338 and 339 cooperate with the rollers 340 and 341 to shift the pitman 337 toward the right. The pitman 337, through the slot 336 and the stud 335, rocks the arm 334, the bail 333, and the arm 331 clockwise, whereupon the spring 225 lowers the hammer 221 until the stud 226 rests on the arm 227. After the hammer 221 has had time to operate, and near the end of said cycle of operation, the cams 338 and 339 move the pitman 337 toward the left, which rocks the arms 334 and 331 counter-clockwise. When this occurs, the arm 331 will coact with the stud 332 to move the hammer 221 slightly clockwise to raise the stud 302 sufficiently to permit the flange 301 to be positioned thereunder, as heretofore described.

*Control of upper hammers by check control key*

The machine is provided with the regular check control key, whereby the upper hammers may all be rendered ineffective when a check is not desired. In Fig. 1 is shown a check control key 440 pivoted at 441 to the printer frame 101, shown only in Fig. 9. This key controls the hammers 111, 112, and 113 in the manner fully shown and described in United States Letters Patent to Samuel Brand, No. 1,812,194, dated June 30, 1931, and such controls need not be repeated here.

However, on the operation following one in which the key 440 has been depressed, it is necessary to control the total hammer 112 and the electro hammer 113 to prevent them from operating during said following operation. Therefore, the link 442, which is pivoted to the key 440, has an arm 443 with a flange 444 positioned to the rear of the arm 405. Upon depression of the key 440, the flange 444 rocks the arm 405 above the stud 407 of the total hammer 112 and simultaneously rocks the arm 406 above the stud 323 of the electro hammer 113, and said arms 405 and 406 are so held by the hook 410 of lever 409, as previously described, until near the end of an operation following an operation in which the key 440 has been depressed, in order to prevent the hammers 112 and 113 from operating during an item-entering operation.

The key 440 is held depressed by a pawl 445 engaging a notch 446 of an arm 447, to which the link 442 is pivoted, and is held depressed until a total of the items is taken, whereupon it is released by an arm 448, secured to the usual shaft 449, which arm 448, by its counter-clockwise movement, releases the pawl 445 from the arm 447 in the manner and by means shown and described in said Brand patent.

As the functions and operations of the present machine were quite fully described at the beginning of this specification, and as the complete operations of all of the mechanisms for performing these functions have been described throughout the specification, it is not thought necessary to give a description of the operation of the machine again.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, the combination of a printing hammer; a retracting spring for said hammer; means engaging the hammer to normally maintain the hammer in an unretracted position against the action of said spring; a spring, stronger than the retracting spring, operatively connected to said means to normally maintain said means in position to maintain the hammer in unretracted position; a cam to actuate said means, and tension said stronger spring, to release the hammer to the action of the retracting spring, said cam formed to thereafter release said means to the action of the stronger spring to operate the hammer for printing; a pawl normally urged toward a position wherein the pawl engages said means to hold the means in operated position; a spring-actuated arm operatively connected to said pawl, said hammer engageable with the arm when the hammer is retracted to hold the pawl out of said holding position; and means selectively positionable into one or another position; which means, when in one position, engages the hammer to prevent retraction of the hammer by the retracting spring, thereby permitting the pawl to move into said holding position and prevent operation of said hammer, said last-named means, when in said another position, releasing the hammer to the action of its retracting spring and upon being retracted engages said arm to move said pawl out of holding position to release said first-named means to the action of said stronger spring to operate the hammer for printing.

2. In a machine of the class described, the combination of a printing hammer; an operating arm for said hammer; a spring connected to the hammer and tensioned to draw the hammer into engagement with the operating arm; cam means to retract the operating arm in one direction; a spring to actuate the operating arm in the reverse direction to move the hammer in printing direction; means engageable with the hammer to maintain the hammer in normal position and movable out of engagement with the hammer to release the hammer to the action of the first-named spring; means located in the path of travel of the hammer; and a spring to normally urge the last-named means to engage the operating arm when the operating arm is moved to the retracted position by the cam means, to maintain the operating arm in retracted position when the hammer is maintained in normal position by the means to engage the hammer, and movable out of the path of movement of the retracted operating arm by the hammer when the hammer is thereafter moved by said first-named spring upon being released by the means to engage the hammer.

3. In a machine of the class described, the combination of a printing hammer; an operating device for said hammer; a resilient means to draw the hammer into engagement with the device; cam means to retract said device preparatory to the device operating said hammer for printing and thereafter to release said device; a spring to operate the device in printing direction after the cam has retracted and released said device; an element normally urged into the return path of movement of the device to retain said device in its retracted position; means movable into engagement with said hammer to maintain the hammer against movement by said resilient means; and means resiliently connected to said element and extending into the path of movement of the hammer so as to be operable by said hammer when the latter is drawn into engagement with the device after the device is retracted by said cam, to withdraw said element from the return path of movement of said device to thereby cause the spring to operate the device and through the device move the printing hammer in printing direction.

4. In a machine of the class described, the combination of a printing hammer having a normal position and a retracted position; an operating device for said hammer; a spring for moving said device and thereby moving said printing hammer in printing direction; a resilient means to draw the hammer into engagement with the device; means for retracting said device preparatory to the device being operated by said spring and thereby operating said hammer to print; a settable means cooperable with the hammer when in one position to maintain the hammer in the normal unretracted position and said settable means movable into another position to release the hammer to the action of the resilient means; and means including a pair of interconnected members, one member being normally effective to engage and maintain said device in its retracted position, and the other member being located in the path of movement of the hammer so as to be actuated by said hammer when the latter is released by said settable means, to withdraw said first-mentioned member from engagement with said device to release the device to the action of said spring.

5. In a machine of the class described, the combination of a printing hammer; an operating device for said hammer; a spring for actuating said device; resilient means to draw the hammer into engagement with said device; settable means engageable with the hammer for maintaining said hammer against the action of the resilient means, said settable means movable out of engagement with the hammer for releasing said hammer to the action of the resilient means; means for retracting said device preparatory to the device being operated by said spring for operating said hammer to print; means normally effective to move into engagement with said device when said device is in its retracted position to maintain said device in said retracted position; and means operated by the hammer when the hammer is released to the action of the resilient means for withdrawing the normally effective means, to thereby free the retracted device to be operated by said spring and to thereby operate the hammer to print.

ELMER C. CARTER.
CHARLES G. DUDIS.

REFERENCES CITED

The following references are of record in the file of this patent:

UNITED STATES PATENTS

| Number | Name | Date |
|---|---|---|
| 1,628,336 | Shipley | May 10, 1927 |
| 1,613,129 | Robertson | Jan. 4, 1927 |
| 1,730,052 | Berger | Oct. 1, 1929 |
| 1,747,743 | Sundstrand | Feb. 18, 1930 |
| 1,812,194 | Brand | June 30, 1931 |
| 1,817,883 | Shipley | Aug. 4, 1931 |
| 1,865,147 | Shipley | June 28, 1932 |
| 1,898,048 | Goldberg | Feb. 21, 1933 |
| 1,963,733 | Brand | June 19, 1934 |
| 2,139,719 | Brietling et al. | Dec. 13, 1938 |
| 2,209,771 | Griers et al. | July 30, 1940 |
| 2,229,731 | Fort | Jan. 28, 1941 |

FOREIGN PATENTS

| Number | Country | Date |
|---|---|---|
| 699,806 | France | July 12, 1930 |
| 852,846 | France | Nov. 9, 1939 |